United States Patent
Duty et al.

(10) Patent No.: US 10,618,480 B2
(45) Date of Patent: Apr. 14, 2020

(54) METHOD OF CHARGE UTILIZATION FROM AN ULTRA-CAPACITOR

(71) Applicants: Mark J Duty, Goodrich, MI (US); Daniel R King, Yale, MI (US)

(72) Inventors: Mark J Duty, Goodrich, MI (US); Daniel R King, Yale, MI (US)

(73) Assignee: FCA US LLC, Auburn Hills, MI (US)

( * ) Notice: Subject to any disclaimer, the term of this patent is extended or adjusted under 35 U.S.C. 154(b) by 135 days.

(21) Appl. No.: 15/840,645

(22) Filed: Dec. 13, 2017

(65) Prior Publication Data
US 2019/0176728 A1 Jun. 13, 2019

(51) Int. Cl.
*B60R 16/033* (2006.01)
*H02J 7/00* (2006.01)

(52) U.S. Cl.
CPC .......... *B60R 16/033* (2013.01); *H02J 7/0052* (2013.01)

(58) Field of Classification Search
None
See application file for complete search history.

(56) References Cited

U.S. PATENT DOCUMENTS

| | | | | |
|---|---|---|---|---|
| 5,914,542 A * | 6/1999 | Weimer | ................. | H02J 7/345 307/125 |
| 2010/0151288 A1* | 6/2010 | Chowdhury | ...... | H01M 8/04231 429/429 |
| 2010/0244573 A1* | 9/2010 | Karnick | .................... | H02J 7/34 307/80 |
| 2014/0084817 A1* | 3/2014 | Bhavaraju | ............... | B60L 50/40 318/139 |

OTHER PUBLICATIONS

Weissler, Paul, "Mazda Introduces Supercapictor-Type Regenerative Braking", SAE International, Feb. 20, 2013.

* cited by examiner

*Primary Examiner* — Jared Fureman
*Assistant Examiner* — Joel Barnett
(74) *Attorney, Agent, or Firm* — Ralph E. Smith

(57) ABSTRACT

A method of utilizing charge from an ultra-capacitor in a vehicle electrical system having a voltage bus and having one or more voltage tolerant devices, includes when one of the voltage tolerant devices is turned on, electrically isolating that voltage tolerant device from the voltage bus, electrically isolating the ultra-capacitor from the voltage bus and electrically coupling the voltage tolerant device directly to the ultra-capacitor. In an aspect, the method includes electrically isolating the voltage tolerant device and the ultra-capacitor from the voltage bus and electrically coupling the voltage tolerant device directly to the ultra-capacitor when the ultra-capacitor has discharged to a nominal depletion voltage level.

3 Claims, 3 Drawing Sheets

METHOD OF CHARGE UTILIZATION FROM AN ULTRA-CAPACITOR

FIELD

The present invention relates to a method of charge utilization from an ultra-capacitor in an automotive vehicle.

BACKGROUND

Ultra-capacitors are uniquely suited for use in regenerative braking because they are able to store electrical charge at a rapid rate. In an electrical system of an automotive vehicle having an ultra-capacitor and an alternator, regardless of alternator voltage level used for charging, the vehicle electrical system must regulate voltage to a minimum system voltage to maintain the functionality of electrical components in the vehicle. This minimum system voltage limits the amount of charge that can be utilized from the ultra-capacitor, since the ultra-capacitor can never be fully discharged below this minimum system voltage. Because of this, a significant portion of the charge stored in the ultra-capacitor is typically never utilized to provide power to electrical components in the vehicle electrical system.

For example, in an automotive vehicle having a 24 VDC (nominal) charging system with a 12 VDC (nominal) vehicle electrical system architecture, the ultra-capacitor is charged to about 25 VDC and can only be depleted until the voltage reaches a nominal voltage depletion level, in this case, about 14.8 VDC. VDC is volts direct current. In a vehicle having a 12 VDC (nominal) charging system with a 12 VDC (nominal) vehicle electrical system architecture, the ultra-capacitor is charged to about 15 VDC and can only be depleted until the voltage reaches approximately about 12.6 VDC. This limits the amount of utility for an ultra-capacitor of a given size as the remaining charge of the ultra-capacitor is not able to be released. Therefore, when the next regenerative braking event occurs, only some of the total capacity of the ultra-capacitor can be utilized to store the energy from the regenerative braking.

SUMMARY

In accordance with an aspect of the present disclosure, a method of utilizing charge in an ultra-capacitor of a vehicle having one or more voltage tolerant devices includes when one of the voltage tolerant devices is turned on, electrically isolating that voltage tolerant device from the voltage bus, electrically isolating the ultra-capacitor from the voltage bus and electrically coupling the voltage tolerant device directly to the ultra-capacitor. In an aspect, electrically isolating the voltage tolerant device and the ultra-capacitor from the voltage bus and electrically coupling the voltage tolerant device directly to the ultra-capacitor includes electrically isolating the voltage tolerant device from the voltage bus and electrically coupling the voltage tolerant device to the ultra-capacitor when the ultra-capacitor has discharged to a nominal depletion voltage level.

In an aspect, the method further includes electrically re-coupling the voltage tolerant device to the voltage bus when the ultra-capacitor has discharged to a minimum operating voltage level of the voltage tolerant device.

BRIEF DESCRIPTION OF THE DRAWINGS

The present invention will become more fully understood from the detailed description and the accompanying drawings, wherein.

DETAILED DESCRIPTION

Figure 1:
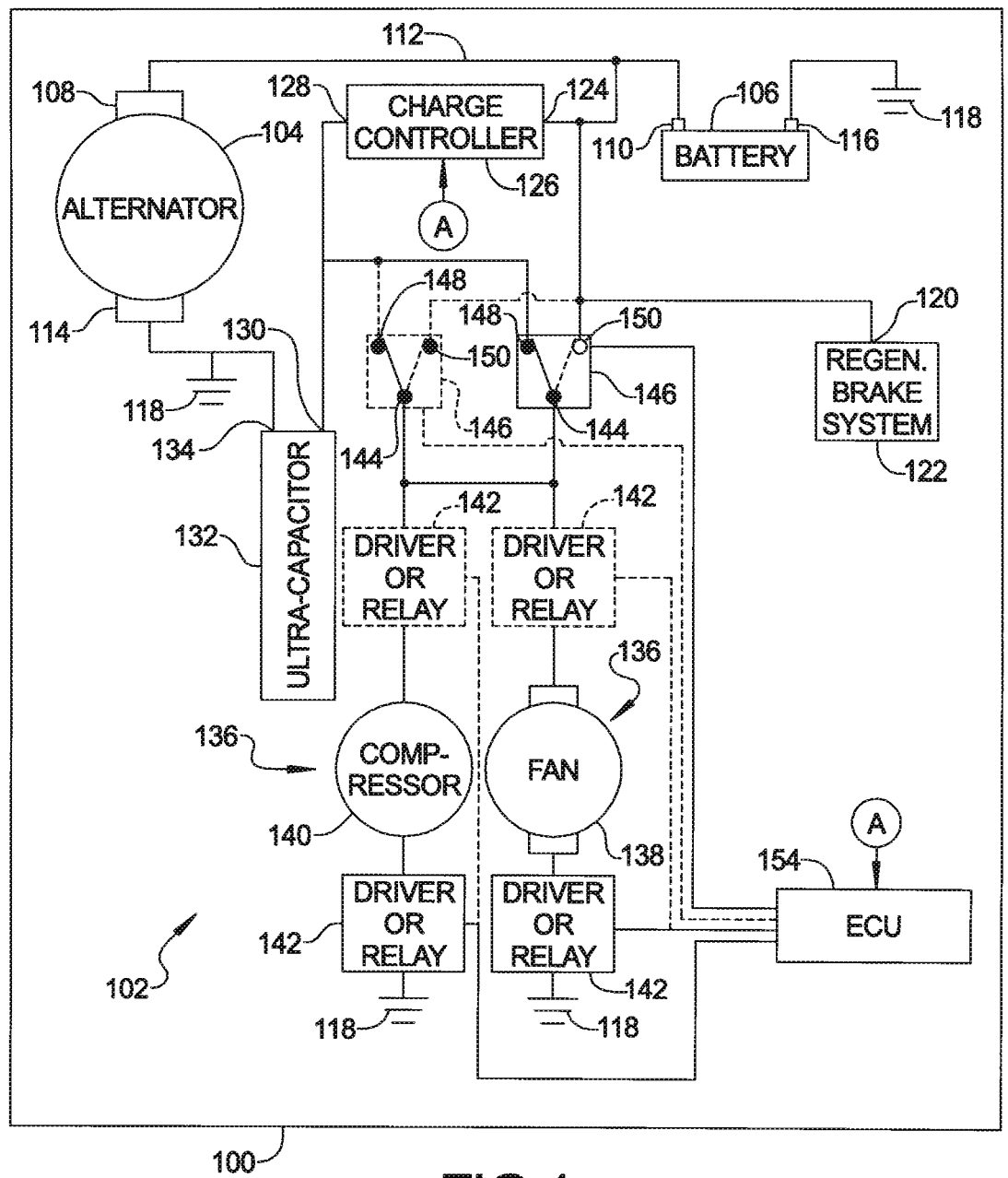
FIG. 1 is a simplified diagrammatic view of an electrical architecture of a vehicle having an ultra-capacitor in which a charge of the ultra-capacitor is used in accordance with an aspect of the present disclosure.

The following description of the preferred embodiment(s) is merely exemplary in nature and is in no way intended to limit the invention, its application, or uses. Corresponding reference numerals indicate corresponding parts throughout the several views of the drawings.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. If, for some reason, the imprecision provided by "about" is not otherwise understood in the art with this ordinary meaning, then "about" as used herein may indicate a possible variation of up to 5% of the indicated value or 5% variance from usual methods of measurement.

FIG. 1 is a simplified diagrammatic view of a vehicle 100 (shown representatively by box 100) having an electrical system 102. Electrical system 102 includes an alternator 104 and a battery 106 having respective positive voltage terminals that are electrically coupled (directly or via a circuit such as a voltage regulator [not shown]) to a voltage bus 112. Respective common terminals 114, 116 of alternator 104 and battery 106 are electrically connected to an electrical common 118 of vehicle 100, referred to herein as vehicle electrical common 118. A positive voltage terminal 120 of a regenerative braking system 122 is electrically coupled to voltage bus 112. A power input 124 of a charge controller 126 is electrically coupled to voltage bus 112 and a power output 128 of charge controller 126 is electrically coupled to a power input/output 130 of an ultra-capacitor 132. A common terminal 134 of ultra-capacitor 132 is electrically coupled to vehicle electrical common 118. Charge controller 126 controls the rate of charge into the ultra-capacitor from the alternator 104 and in an example is or includes a DC-DC converter.

Ultra-capacitor 132 is used to provide power to one or more voltage level tolerant devices 136 as described in more detail below. A voltage level tolerant device as used herein is an electrically powered device that will continue to function adequately when the voltage powering the device is less than the nominal operating voltage of the device until this voltage drops to a minimum operating voltage level. By way of example and not of limitation, voltage level tolerant devices 136 include a radiator cooling fan 138 and an HVAC compressor 140. HVAC is heating, ventilation and air-conditioning. Radiator cooling fan 138 for example has a 12 VDC nominal operating voltage and an 8 VDC minimum operating voltage level.

Each voltage level tolerant device is electrically coupled in series with a controlled switch 142 between a common contact 144 of a power selection relay 146 and vehicle electrical common 118. In a low side driver configuration shown by solid boxes 142 in FIG. 1, the controlled switch 142 is coupled between the voltage level tolerant device 136 and vehicle electrical common 118. In a high side driver configuration, the controlled switch 142 is coupled between common contact 144 and the voltage level tolerant device 136 as shown by phantom boxes 142 in FIG. 1. A contact 148 of power selection relay 146 is electrically coupled to a power input/output 130 of ultra-capacitor 132. Another contact 150 of power selection relay 146 is electrically coupled to voltage bus 112. It should be understood that power input/output 130 could be electrically coupled to contact 150 and voltage bus 112 electrically coupled to contact 148 of power selection relay 146. It should also be understood that controlled switch 142 can be any type of controlled switch that is switchable between an open and closed state in response to a control signal, such as a solid state driver or an electro-mechanical relay. Similarly, power selection relay 146 can be any type of solid state switch or electro-mechanical relay that is switchable in response to a control signal to switch common contact 144 between contact 150 and contact 148. Each controlled switch 142 has a control input 152 (a coil for example in the case of a relay) electrically coupled to a respective control output 154 of an ECU 154 of vehicle 100 and power selection relay 146 has a control input (a coil for example) electrically coupled to a respective control output 152 of ECU 154. ECU is an electronic control unit.

It should be understood that each voltage level tolerant device 136 can be electrically coupled to the common contact 144 of a single power selection relay 146 or each electrically coupled to the common contact 144 of respective separate power selection relays 146.

Ultra-capacitor 132 is charged in conventional fashion, such as described in the Background section of the present application. Ultra-capacitor 132 is used to provide power to voltage level tolerant devices 136 under control of ECU 154. ECU 154 determines when to turn a voltage level tolerant device on and off. Referring to radiator cooling fan 138 by way example and not of limitation, when ECU 154 determines to turn radiator cooling fan 138 on ECU 154 energizes controlled switch 142 which closes and completes an electrical circuit for radiator cooling fan 138 turning it on.

An electrical system that is a 12 VDC (nominal) electrical system that has a 24 VDC charging system that will charge ultra-capacitor 132 to approximately 25 VDC is used as an example in the following discussion. ECU 154 controls power selection relay 146 so that common contact 144 is connected to contact 150 thus electrically coupling radiator cooling fan 138 to voltage bus 112. Ultra-capacitor 132 may be providing power to voltage bus 112 through charge controller 126 in which case it is discharging. In some cases, ultra-capacitor 132 may be charged via charge controller 126 or simply in a passive mode where it is not being charged nor providing power to the voltage bus 112.

When ultra-capacitor 132 is providing power to voltage bus 112 and discharges to a nominal depletion voltage level, about 14.8 VDC in this example, ECU 154 controls power selection relay 146 to switch so that common contact 144 is connected to contact 148 instead of contact 150 electrically isolating radiator cooling fan 138 from voltage bus 112 and electrically coupling radiator cooling fan 138 directly to ultra-capacitor 132, such as to power input/output 130. As used herein, when a voltage tolerant device 136 such as radiator cooling fan 138 is electrically isolated from voltage bus 112 and electrically coupled directly to ultra-capacitor 132, the voltage tolerant device 136 is not drawing power from voltage bus 112 when the voltage tolerant device 136 is on but is drawing power from ultra-capacitor 132 without the power flowing through voltage bus 112. Charge controller 126 is turned off by ECU 154 electrically isolating ultra-capacitor 132 from voltage bus 112 so that ultra-capacitor 132 is not providing power to voltage bus 112. Ultra-capacitor 132 continues to power radiator cooling fan 138 until ultra-capacitor 132 discharges to the minimum operating voltage of radiator cooling fan 138, such as 8 VDC. When ultra-capacitor 132 has discharged to the minimum operating voltage of radiator cooling fan 138, ECU 154 opens power selection relay 146 reconnecting radiator cooling fan 138 to voltage bus 112. ECU 154 similarly controls the controlled switch 142 associated with each voltage tolerant device 136 and associated power selection relay 146 to power each voltage tolerant device 136 with power from ultra-capacitor 132.

In a variation, when a voltage tolerant device 136 is turned on, the voltage tolerant device 136 is electrically decoupled from the voltage bus 112 as is the ultra-capacitor 132, such as in the manner described above. Ultra-capacitor 132 then powers the voltage tolerant device 136 directly, as opposed to via the voltage bus 112, until ultra-capacitor 132 discharges to the minimum operating voltage of the voltage tolerant device 136. When ultra-capacitor 132 has discharged to the minimum operating voltage of the voltage tolerant device 136, ECU 154 switches power selection relay 146 electrically recoupling the voltage tolerant device 136 the voltage bus 112.

Figure 2:
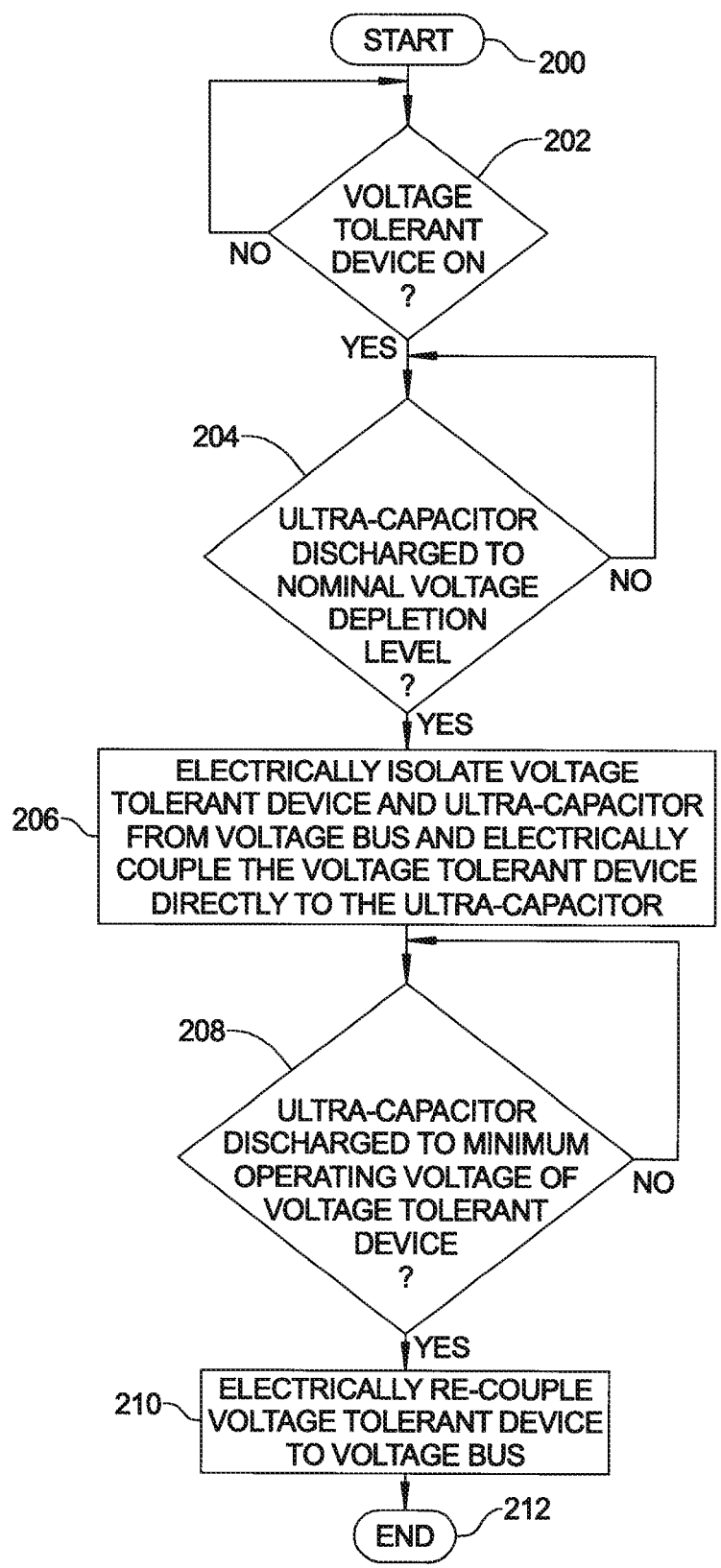
FIG. 2 is a flow chart of a method for utilizing the charge of the ultra-capacitor to power a voltage tolerant device in the vehicle in accordance with an aspect of the present disclosure.

FIG. 2 is a basic flow chart of control logic for a control routine for one of the above control variations, illustratively implemented in ECU 154, such as in software. The control routine starts at 200. At 202, the control routine checks whether a voltage tolerant device 136 has been turned on. If not, the control routine branches back to 202. If a voltage tolerant device 136 has been turned on, the control routine proceeds to 204 where it checks whether ultra-capacitor 132 has discharged to the nominal voltage depletion level. If not, the control routine branches back to 202.

If at 204 the ultra-capacitor 132 has discharged to the nominal depletion level, the control routine proceeds to 206 where it electrically isolates the voltage tolerant device 136 and ultra-capacitor 132 from voltage bus 112 and electrically couples the voltage tolerant device 136 directly to ultra-capacitor 132. The control routine then proceeds to 208 where it checks whether ultra-capacitor 132 has discharged to the minimum operating voltage level of the voltage tolerant device 136. If not, the control routine branches back to 208. If at 208 ultra-capacitor 132 has discharged to the minimum operating voltage level of voltage tolerant device 136, the control routine proceeds to 210 where it electrically re-couples the voltage tolerant device 136 to voltage bus 112, and then proceeds to 212 where it ends. It should be understood that whenever voltage tolerant device 136 is turned off, the control routine will also end.

Figure 3:
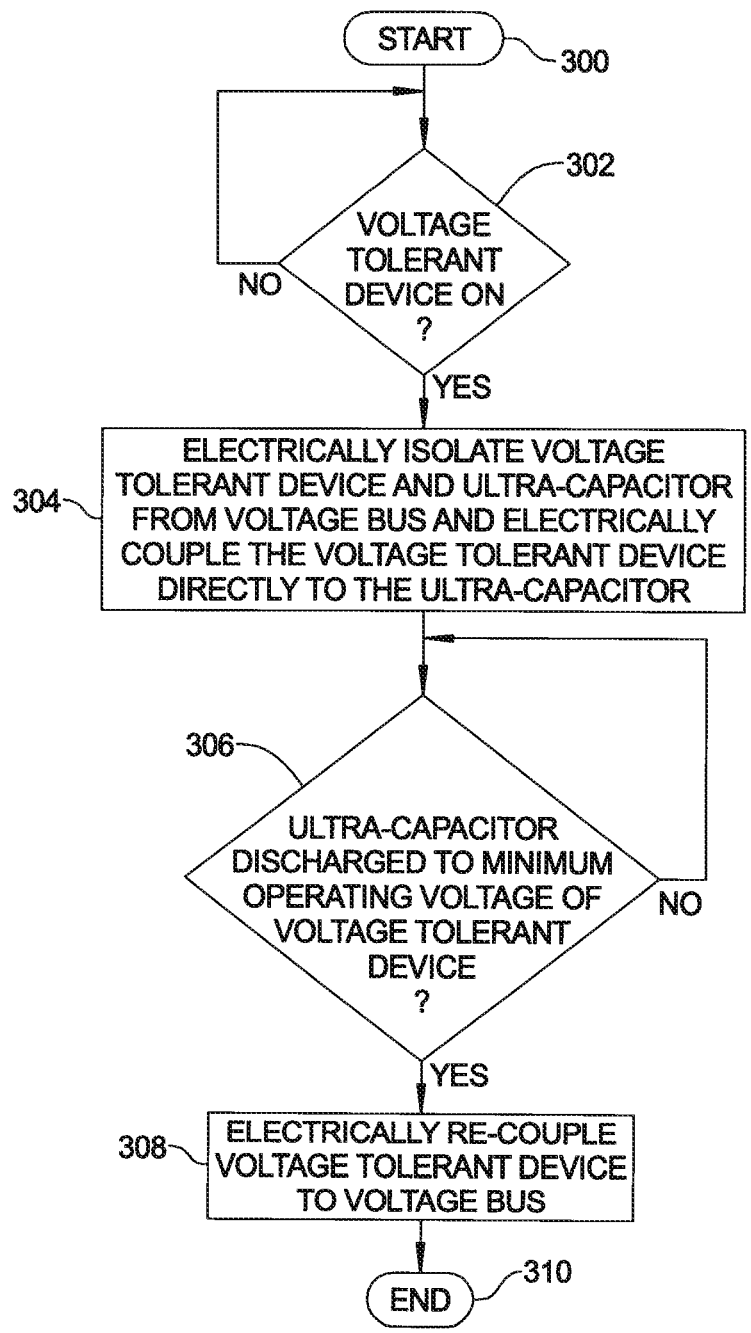
FIG. 3 is a flow chart of another method for utilizing the charge of an ultra-capacitor to power a voltage tolerant device in the vehicle.

FIG. 3 is a basic flow chart of control logic for a control routine for the other of the above control variations, illustratively implemented in ECU 154, such as in software. The control routine starts at 300. At 302, the control routine checks whether a voltage tolerant device 136 has been turned on. If not, the control routine branches back to 302. If a voltage tolerant device 136 has been turned on, the control routine proceeds to 304 where it electrically isolates the voltage tolerant device 136 and ultra-capacitor 132 from voltage bus 112 and electrically couples the voltage tolerant device 136 directly to ultra-capacitor 132. The control routine then proceeds to 306 where it checks whether ultra-capacitor 132 has discharged to the minimum operating voltage level of the voltage tolerant device 136. If not, the control routine branches back to 306. If at 206 ultra-capacitor 132 has discharged to the minimum operating voltage level of voltage tolerant device 136, the control routine proceeds to 308 where it electrically re-couples the voltage tolerant device 136 to voltage bus 112, and then proceeds to 310 where it ends. It should be understood that whenever voltage tolerant device 136 is turned off, the control routine will also end.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of utilizing charge from an ultra-capacitor in a vehicle electrical system having a voltage bus and having one or more voltage tolerant devices, comprising:

when one of the voltage tolerant devices is turned on, electrically isolating that voltage tolerant device from the voltage bus, electrically isolating the ultra-capacitor from the voltage bus, electrically coupling the voltage tolerant device directly to the ultra-capacitor, and powering the voltage tolerant device directly from the ultra-capacitor including after the ultra-capacitor has discharged below a nominal voltage of the voltage bus.

2. The method of claim 1 further including waiting until the ultra-capacitor has discharged to a nominal depletion voltage level to electrically isolate the voltage tolerant device and the ultra-capacitor from the voltage bus and electrically couple the voltage tolerant device directly to the ultra-capacitor and when the ultra-capacitor has discharged to the nominal depletion level, then electrically isolating the voltage tolerant device and the ultra-capacitor from the voltage bus and electrically coupling the voltage tolerant device directly to the ultra-capacitor.

3. The method of claim 1 including powering the voltage tolerant device directly from the ultra-capacitor until the ultra-capacitor has discharged to a minimum operating voltage level of the voltage tolerant device and once the ultra-capacitor has discharged to the minimum operating voltage level of the voltage tolerant device, then electrically re-coupling the voltage tolerant device to the voltage bus.

* * * * *